US005234771A

United States Patent [19]

Mohri et al.

[11] Patent Number: 5,234,771

[45] Date of Patent: Aug. 10, 1993

[54] PERMANENT MAGNET HAVING HIGH CORROSION RESISTANCE

[75] Inventors: Fumihito Mohri; Takuji Nomura; Shougo Miki, all of Otsu, Japan

[73] Assignee: Kanegafuchi Kagaku Kogyo Kabushiki Kaisha, Osaka, Japan

[21] Appl. No.: 759,369

[22] Filed: Sep. 13, 1991

[30] Foreign Application Priority Data

Sep. 18, 1990 [JP] Japan ................................. 2-249090

[51] Int. Cl.$^5$ ............................................. B32B 15/04

[52] U.S. Cl. ..................................... 428/460; 428/900

[58] Field of Search ............................... 428/460, 900; 252/62.54

[56] References Cited

FOREIGN PATENT DOCUMENTS 1426252 12/1966 France .
61-168221 7/1986 Japan .
0248665 12/1987 Japan .
63-244710 10/1988 Japan .
63-244711 10/1988 Japan .

OTHER PUBLICATIONS

Patent Abstracts of Japan, vol. 13, No. 240 (E-757) (3588), Jun. 6, 1989 and JP-1 044 006 (Sieko Epson Corp), Feb. 16 1989.

*Primary Examiner*—Thomas J. Herbert, Jr.
*Attorney, Agent, or Firm*—Armstrong, Westerman, Hattori, McLeland & Naughton

[57] ABSTRACT

A sintered or bonded permanent magnet formed from a material consisting mainly of iron, particularly a Nd-Fe-B alloy, and having a high corrosion resistance has a surface coated with a resin obtained by the polycondensation of tannic acid, phenols and aldehydes; a bonded magnet is also made from a powder of any such material composed of particles coated with any such resin.

3 Claims, 2 Drawing Sheets

PERMANENT MAGNET HAVING HIGH CORROSION RESISTANCE

BACKGROUND OF THE INVENTION

1. Field of the Invention

This invention relates to a permanent magnet made from a magnetic material consisting mainly of iron, and having an improved level of rustproofness, and a process for manufacturing the same. More particularly, it is concerned with a resin-bonded (hereinafter referred to simply as "bonded"), or sintered magnet composed of a rare earthiron-boron ("Nd-Fe-B") alloy or compound, and a process for manufacturing the same.

2. Description of the Prior Art

It has long been known that there are alloys or compounds consisting mainly of iron, i.e. containing at least 50 atom % of iron, and exhibiting very high magnetic properties, since iron is an element having a higher saturation magnetic flux density at room temperature than that of any other element, and that those alloys or compounds can be used to make, for example, resin-bonded or sintered permanent magnets having very high magnetic properties. $Nd_2Fe_{14}B$, $SmFe_{12}$ and $Fe_{16}N_2$ are examples of recently developed alloys or compounds exhibiting very high magnetic properties. These alloys or compounds, however, have the drawback of being easily oxidized to get rusty, since they contain a high proportion of iron. This is particularly the case with Nd-Fe-B magnets for which there has recently been a growing demand. They easily get rusty in a highly humid environment. Various methods have, therefore, been proposed for rustproofing those magnets. They include coating the surface of a resin-bonded Nd-Fe-B magnet with an acrylic or epoxy resin (Japanese Patent Application Laid-Open No. 244710/1988 or 244711/1988), or with a fluorine-containing resin (Japanese Patent Application Laid-Open No. 168221/1986). There have also been made attempts to form an electrodeposited layer on the surface of a magnet, or plate it with a metal such as nickel.

All of the proposed methods, however, have their own drawbacks. The resin coating of the magnet surface is an incomplete rustproofing method, since it is difficult for the resin to shut off oxygen and water completely, though it is an economical method. Electrodeposition is a method which is economically unacceptable. Metal plating is also economically unacceptable and has, moreover, the drawback that a trace of plating solution remaining on the magnet surface may rather accelerate its corrosion.

Sintered Nd-Fe-B magnets are also very likely to get rusty in a humid environment, and are, therefore, plated with e.g. nickel. The drawbacks of such plating have, however, been already pointed out. The addition of chromium or nickel to the magnet material improves its corrosion resistance to some extent, but is not common practice, since it lowers the magnetic properties of the magnet.

Thus, all of the known methods for rustproofing a magnet composed of a rare earth alloy or compound, particularly Nd-Fe-B, are more or less defective, whether the magnet may be a bonded or sintered one.

SUMMARY OF THE INVENTION

Under these circumstances, it is an object of this invention to provide an inexpensive and corrosion-resistant permanent magnet composed of an alloy or compound consisting mainly of iron, particularly Nd-Fe-B.

This object is essentially attained by using a special resin for coating the surface of a magnet, or for coating the particles of a powder of a magnetic material from which a magnet is made. This resin is obtained by the polycondensation reaction of tannic acid, phenols and aldehydes in the presence of an acid catalyst.

DETAILED DESCRIPTION OF THE INVENTION

The magnet of this invention is formed from a magnetic material containing at least 50 atom % of iron. Specific examples of the preferred materials include $Nd_2Fe_{14}B$, another Nd-Fe-B alloy (or intermetallic compound) further containing, for example, another rare earth element such as Pr or Dy, another transition element such as Co or V, or another element such as Al, Ga or Nb, a compound obtained by adding another element or elements, such as Al, Si, Ti, Co, V, Cr and Mo, to $SmFe_{12}$ having a crystal structure of the $ThMn_{12}$ type, and a powder of $Fe_{16}N_2$ composed of needle crystals which enable the manufacture of a magnet exhibiting anisotropy. The use of any Nd-Fe-B alloy, or a powder thereof is particularly preferable, since it exhibits higher magnetic properties than any other known magnet material does.

The magnet of this invention may be a resin-bonded, or sintered magnet. The bonded magnet of this invention can be made by using as a binder any appropriate resin known in the art, such as a phenolic, epoxy, urethane, polyamide, or polyester resin.

According to a salient feature of this invention, a special resin which is obtained by the polycondensation reaction of tannic acid, phenols and aldehydes in the presence of an acid catalyst (hereinafter referred to as a "polytannin resin") is used for coating the surface of a bonded or sintered magnet, or for coating the particles of a powder from which a bonded magnet is made.

Figure 1A:
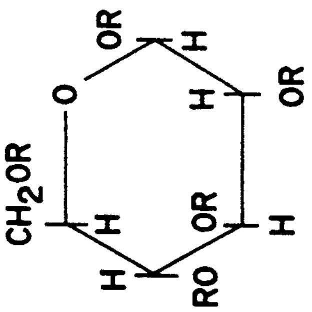
FIG. 1 shows the structural formula of a typical hydrolyzable tannin employed for the purpose of this invention.
Figure 1B:
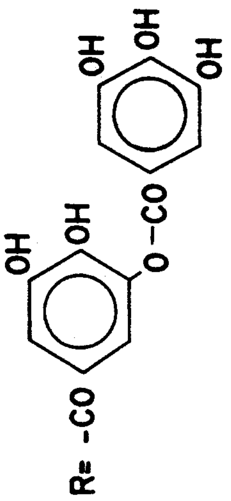

The tannic acid which is used for preparing a polytannin resin is hydrolyzable, or condensed tannin. FIG. 1 shows the structural formula of a typical hydrolyzable tannin. Examples of the phenols which can be employed are phenol, catechol, cresols, xylenols, resorcinol and pyrogallol. Any other monohydric or polyhydric phenols can be used, too.

Examples of the aldehydes are aliphatic aldehydes such as formaldehyde and acetaldehyde, aliphatic dialdehydes such as glyoxal and succindialdehyde, unsaturated aliphatic aldehydes such as acrolein and crotonaldehyde, aromatic aldehydes such as benzaldehyde and salicylaldehyde, and heterocyclic aldehydes such as furfural. Phosphoric or oxalic acid can, for example, be used as the acid catalyst.

The polytannin resin contains hydroxyl groups which can form coordinate bonds with metal ions. It is considered that these hydroxyl groups are chemically adsorbed to the surface of a magnetic material by forming a complex (or chelate) compound with a metal oxide or oxyhydroxide (e.g. FeOOH) existing on the surface of the magnetic material and thereby enable the resin to be strongly bonded to the magnetic material. The resin has a reducing action which apparently inhibits the oxidation of the magnetic material. The resin becomes insoluble in water and very dense when cured by heat on the surface of a magnet, and shuts off water. Moreover, the resin serves as a radical scavenger, since it contains phenols. This, and the fact that an oxygen molecule itself is a kind of radical (triplet radical), apparently explain another reason for the outstandingly high rustproofing power of the polytannin resin. It is apparent that any oxygen molecule is scavenged by any residual hydroxyl group (which remains without forming any complex compound) before it reaches the particles of the magnetic material.

The invention will now be described more specifically with reference to a few examples, as well as comparative examples. It is, however, to be understood that the following description is not intended for limiting the scope of this invention.

EXAMPLE 1 AND COMPARATIVE EXAMPLE 1

A bonded magnet having a surface coated with a polytannin resin

Figure 2:
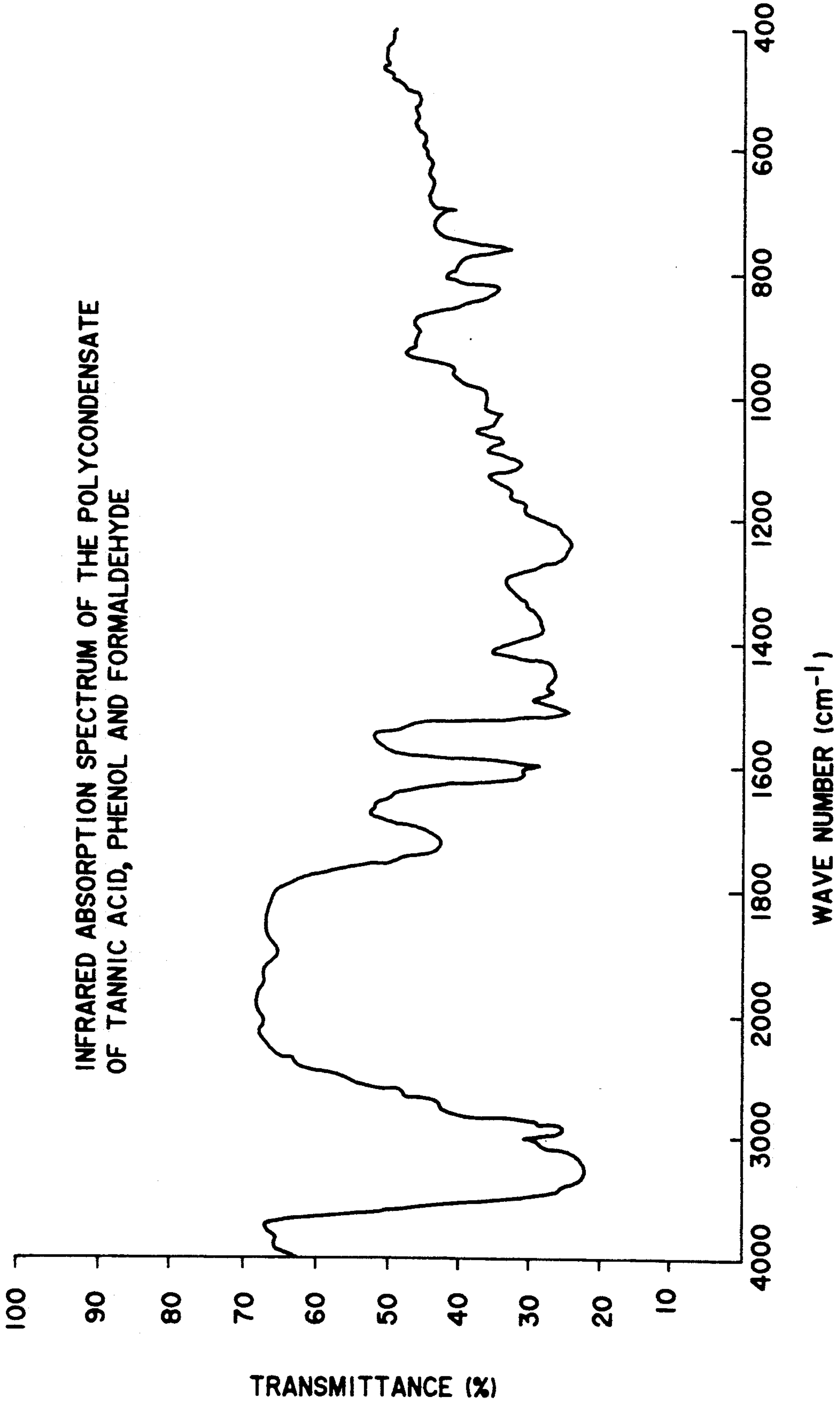
FIG. 2 is a chart showing the infrared absorption spectrum of the polycondensate of tannic acid, phenol and formaldehyde employed in EXAMPLES 1 to 3 as will hereinafter be described.

An annular bonded magnet having an outside diameter of 8 mm, an inside diameter of 6 mm and a height of 4 mm was made by press forming from a mixture consisting of 80% by volume of a powder of a Nd-Fe-B alloy which had been prepared by ultrarapid quenching (MQ-B of General Motors), and 20% by volume of a phenolic resin (CJ-1000 of Matsushita Denko). The magnet was dipped in a methylethyl-ketone (MEK) solution containing 15% by weight of a polytannin resin which had been obtained by the polycondensation reaction of tannin having the structural formula shown in FIG. 1, phenol and formaldehyde in the presence of oxalic acid. FIG. 2 shows the infrared absorption spectrum of the polytannin resin, as its molecular structure could not be identified. The magnet which had been lifted from the solution was cured for 15 minutes in a hot oven. Then, it was placed in an environmental tester having a temperature of 60° C. and a humidity of 95%, and after 100 hours, it was taken out and its surface was examined with the naked eye and through an optical microscope having a magnification of 30. As soon as its examination had been finished, the sample was replaced in the tester. This cycle of test was repeated until the sample was exposed to the corrosive conditions in the tester for a total of 600 hours. The results are shown in TABLE 1.

COMPARATIVE EXAMPLE 1 was a repetition of EXAMPLE 1 as hereinabove described, except that the magnet was not coated with any polytannin resin. The results are also shown in TABLE 1.

EXAMPLE 2 AND COMPARATIVE EXAMPLE 2

A bonded magnet made by bonding with an epoxy resin a powder of a magnetic material composed of particles coated with a polytannin resin Particles of MQ-B (see EXAMPLE 1) were dipped in a MEK solution containing 15% by weight of the same polytannin resin as had been used in EXAMPLE 1, and the particles which had been lifted from the solution were cured for 15 minutes in a hot oven, whereby they were coated with the polytannin resin. An annular bonded magnet having an outside diameter of 8 mm, an inside diameter of 6 mm and a height of 4 mm was made by press forming from those particles and an epoxy resin (ARALDITE of Ciba-Geigy) used as a binder. Then, EXAMPLE 1 was repeated for conducting an environmental test for a total of 600 hours. The results are shown in TABLE 1.

COMPARATIVE EXAMPLE 2 was a repetition of EXAMPLE 2 as hereinabove described, except that the particles were not coated with any polytannin resin. The results are also shown in TABLE 1.

EXAMPLE 3 AND COMPARATIVE EXAMPLE 3

A sintered Nd-Fe-B magnet having a surface coated with a polytannin resin

A solid cylindrical sintered Nd-Fe-B magnet having a diameter of 10 mm and a height of 10 mm (NEOMAX 36 of Sumitomo Special Metal) was dipped in a MEK solution containing 15% by weight of the sample polytannin resin as had been used in EXAMPLE 1. The magnet which had been lifted from the solution was cured for 15 minutes in a hot oven. Then, EXAMPLE 1 was repeated for conducting an environmental test for a total of 600 hours. The results are shown in TABLE 1.

COMPARATIVE EXAMPLE 3 was a repetition of EXAMPLE 3 as hereinabove described, except that the magnet was not coated with any polytannin resin. The results are also shown in TABLE 1.

TABLE 1

Results of environmental tests at 60° C. and 95% humidity

| | Test time (hours) and Results | | | | |
|---|---|---|---|---|---|
| | 100 | 200 | 300 | 400 | 600 |
| EXAMPLE 1 | ◎ | ◎ | ◎ | ◎ | Δ |
| COMPARATIVE EXAMPLE 1 | Δ | X | xx | xx | xx |
| EXAMPLE 2 | ◎ | ◎ | ○ | ○ | Δ |
| COMPARATIVE EXAMPLE 2 | Δ | X | xx | xx | xx |
| EXAMPLE 3 | ◎ | ◎ | ○ | ○ | Δ |
| COMPARATIVE EXAMPLE 3 | X | xx | xx | xx | xx |

◎: No rusting occurred;
○: Only spotty rusting;
Δ: A medium degree of rusting;
x: Heavy rusting;
xx: Very heavy rusting resulting even in a mass of rust formed on the magnet surface.

The results shown in TABLE 1 confirm the high rustproofness of all of the bonded magnet of EXAMPLE 1 having its surface coated with the polytannin resin, the bonded magnet of EXAMPLE 2 which was made by bonding with the epoxy resin the particles coated with the polytannin resin, and the sintered magnet of EXAMPLE 3 having its surface coated with the polytannin resin. These results confirm that the polytannin resin is effective for coating both bonded and sintered magnets.

The bonded magnet of this invention is by far superior in corrosion resistance to any conventional bonded magnet made by using only an ordinary resin as a binder. The sintered magnet of this invention is by far superior in corrosion resistance to any magnet not coated with any polytannin resin. The process of this invention is easier and less expensive to carry out than any process involving metal plating.

It is needless to say that still better results can be obtained if a bonded magnet is made from a powder consisting mainly of iron and composed of particles coated with a polytannin resin, and has its surface coated with the polytannin resin, though no detailed description thereof is made.

What is claimed is:

1. A permanent magnet having a high corrosion resistance which comprises a body formed from a magnetic material containing at least 50 atom % of iron, said body having a surface coated with a polycondensation product of tannic acid, phenols and aldehydes.

2. A magnet as set forth in claim 1, wherein said material is a Nd-Fe-B alloy, and said body is a bonded product.

3. A magnet as set forth in claim 1, wherein said material is a Nd-Fe-B alloy, and said body is a bonded product.

* * * * *